(12) United States Patent
Blase et al.

(10) Patent No.: US 7,426,823 B2
(45) Date of Patent: Sep. 23, 2008

(54) ENERGY GUIDING CHAIN

(75) Inventors: Günter Blase, Bergisch Gladbach (DE); Frank Blase, Bergisch Gladbach (DE)

(73) Assignee: Igus GmbH, Cologne (DE)

(*) Notice: Subject to any disclaimer, the term of this patent is extended or adjusted under 35 U.S.C. 154(b) by 195 days.

(21) Appl. No.: 11/101,181

(22) Filed: Apr. 7, 2005

(65) Prior Publication Data
US 2006/0112670 A1    Jun. 1, 2006

(30) Foreign Application Priority Data
Apr. 8, 2004    (DE) .................. 20 2004 005 800 U

(51) Int. Cl.
*F16G 13/00* (2006.01)
*F16L 3/00* (2006.01)

(52) U.S. Cl. .................. 59/78.1; 248/49; 248/51

(58) Field of Classification Search ......... 198/840–841, 198/850–853; 59/5, 78.1, 84, 88; 248/49, 248/51
See application file for complete search history.

(56) References Cited

U.S. PATENT DOCUMENTS

| | | | | |
|---|---|---|---|---|
| 4,392,344 A * | 7/1983 | Gordon et al. | .............. | 59/78.1 |
| 4,669,507 A * | 6/1987 | Moritz | .............. | 59/78.1 |
| 5,890,357 A | 4/1999 | Blasé | .............. | 59/78.1 |
| 6,354,070 B1 | 3/2002 | Blasé | .............. | 59/78.1 |
| 6,367,238 B1 * | 4/2002 | Fischer | .............. | 59/78.1 |
| 6,374,589 B1 * | 4/2002 | Kunert et al. | .............. | 59/78.1 |
| 6,425,238 B1 * | 7/2002 | Blase | .............. | 59/78.1 |
| 6,427,980 B2 | 8/2002 | Blasé | .............. | 254/134.3 FT |
| 6,745,555 B2 | 6/2004 | Hermey et al. | .............. | 59/78.1 |
| 7,047,720 B2 * | 5/2006 | Ikeda et al. | .............. | 59/78.1 |
| 2002/0005510 A1 | 1/2002 | Blase | | |
| 2003/0008740 A1 * | 1/2003 | Jonas | .............. | 59/78.1 |

FOREIGN PATENT DOCUMENTS

| | | |
|---|---|---|
| CA | 2 355 898 | 7/2000 |
| CA | 2 445 267 | 10/2002 |
| DE | 297 24 086 | 11/1999 |

(Continued)

*Primary Examiner*—Derris H Banks
*Assistant Examiner*—Teresa Bonk
(74) *Attorney, Agent, or Firm*—Grossman Tucker Perreault & Pfleger, PLLC

(57) ABSTRACT

For the purpose of improving the discharge of electrical charges via the energy guiding chain, an energy guiding chain (1) with a plurality of links (2), which are connected to each other in articulated fashion and each display opposite side pieces (3) and at least one cross-member (4a) connecting them, where the links (2) consist at least partly of an electrically conductive material that permits the discharge of electrical charges over at least part of the chain length, is characterized in that the links (2) are designed such that they are in contact with each other over the full pivoting angle on contact areas that move relative to each other and are in permanent contact and/or in that at least one connecting element (8) connecting two or more links to each other in each case is provided, which provides contact areas remaining in unchanging position in relation to the links, and in that the contact areas, and the areas of the links or the connecting element connecting them, form a continuous conductivity path with low electrical resistance, which extends at least over several links and permits use of the chain in ESD protection zones.

13 Claims, 7 Drawing Sheets

FOREIGN PATENT DOCUMENTS

Figure 1A:
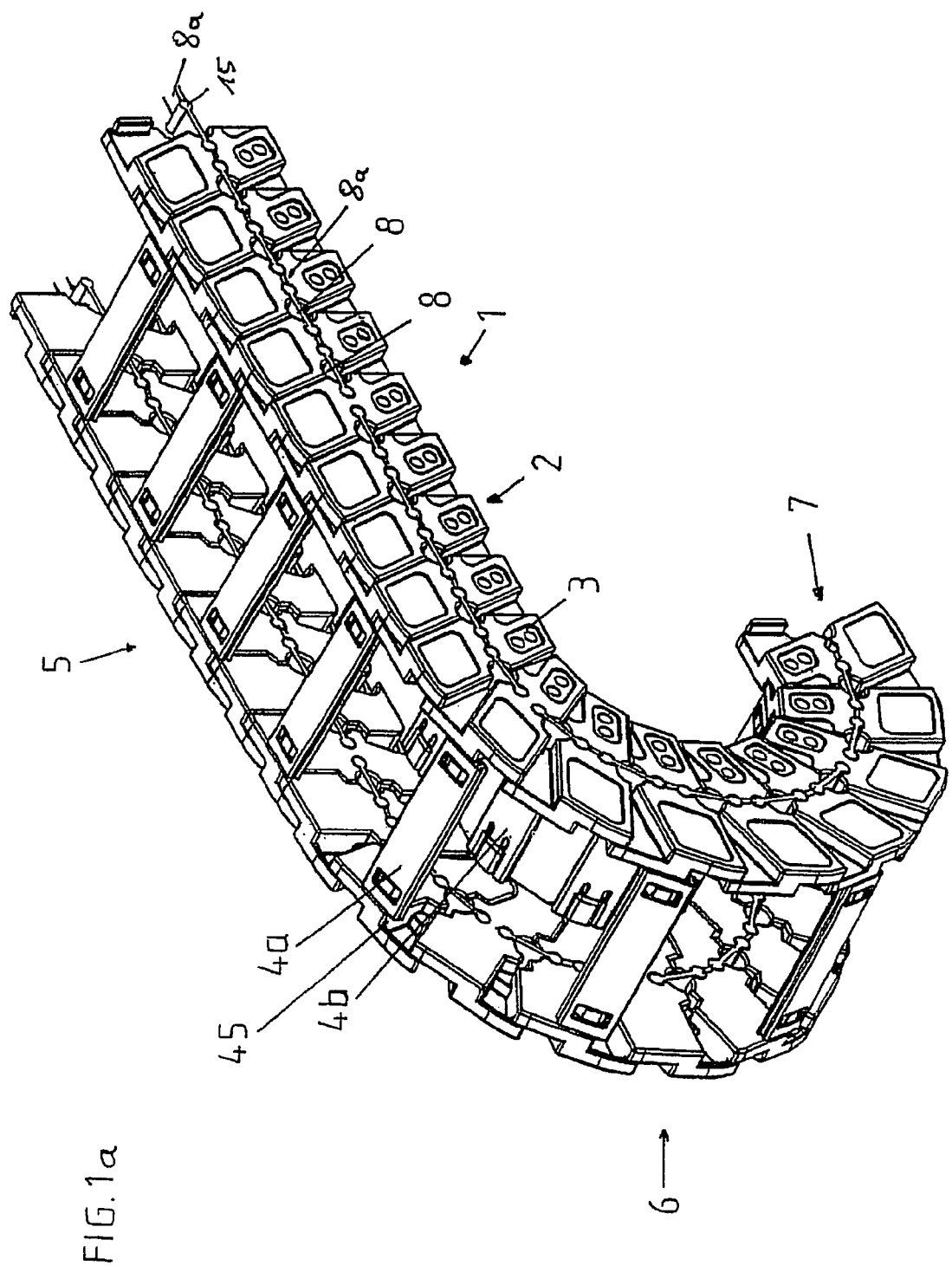

| | | |
|---|---|---|
| DE | 198 60 948 | 7/2000 |
| DE | 201 07 003 | 9/2002 |
| DE | 100 30 985 | 2/2004 |
| DE | 20 2004 005 848 U1 | 3/2005 |
| EP | 0 063 533 | 10/1982 |
| EP | 0 063 533 A1 | 10/1982 |
| EP | 1 138 555 B1 | 10/2001 |
| WO | WO 02/086349 A1 | 10/2002 |
| WO | WO 2005/040659 A1 | 5/2005 |

* cited by examiner

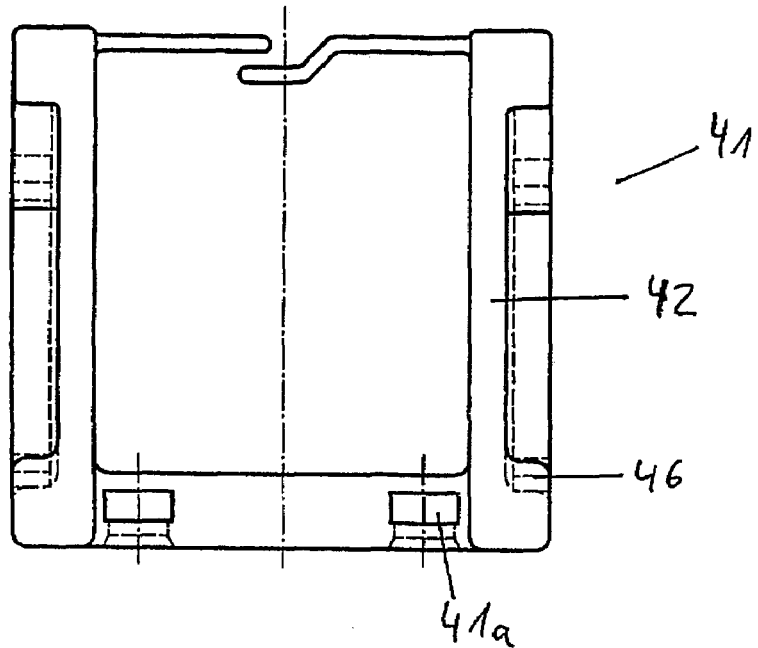
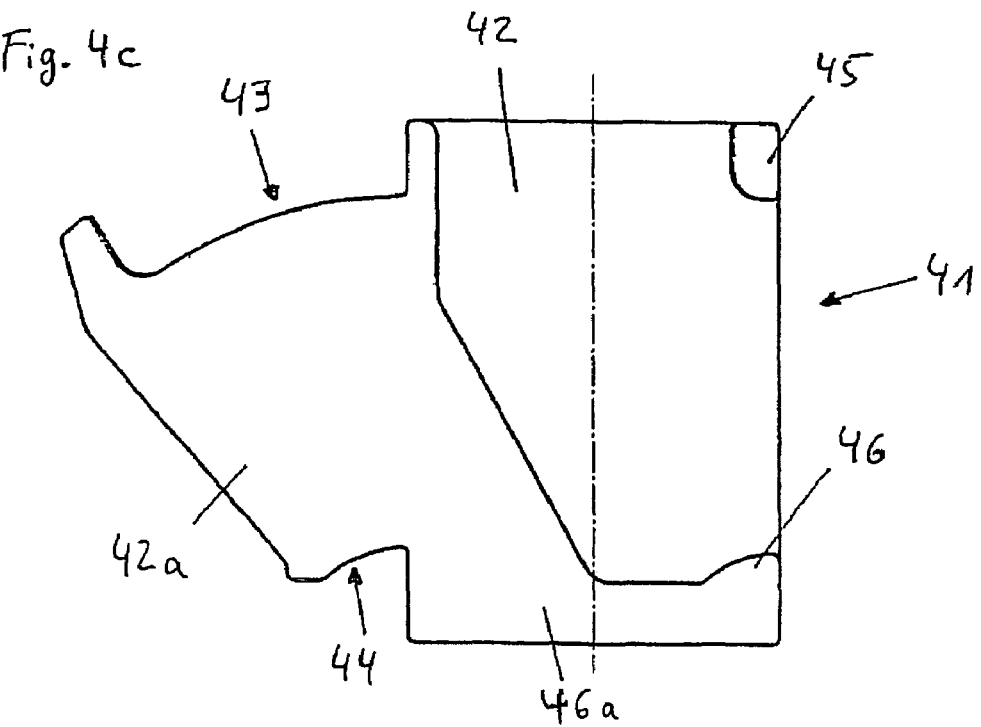

ENERGY GUIDING CHAIN

The invention relates to an energy guiding chain for guiding lines and cables between two consumers, at least one of which is mobile, where the energy guiding chain displays a plurality of links displaying opposite side pieces and at least one cross-member connecting them, where the individual links are connected to each other by at least one pivoted connection that permits pivoting of adjacent links through a pivoting angle relative to each other, such that the energy guiding chain can be arranged to form a lower run, a curved section and an upper run, and where the links consist at least partly of an electrically conductive material that permits the discharge of electrical charges over at least part of the chain length, and thus use of the chain in ESD protection zones.

The ESD compatibility of the chain is designed to avoid electrostatic charges in the chain, so that the energy guiding chain can be used in sensitive areas, e.g. in the production, packaging or transportation of electrical or electronic components, such as semiconductor elements, or in explosion-protected areas. In this context, the energy guiding chain used must be electrically grounded in an appropriate manner, where, in particular, the end fastening links of the energy guiding chain are grounded, by means of which the chain is fastened to the consumers.

In energy guiding chains, the links are mostly connected to each other by pivoted connections in the form of pin-and-hole connections, where pivot pins projecting laterally on the side pieces of a first link engage corresponding recesses on the side pieces of an adjacent link. However, it has been found on various occasions that the energy guiding chains known to date do not always fulfill the above-mentioned ESD requirements, or not dependably enough, particularly when they are made of a plastic material, even if the plastic material in itself displays sufficiently high electrical conductivity.

Therefore, the object of the invention is to create an energy guiding chain that can be used dependably at all times in ESD protection zones, or other zones with comparable requirements profiles, and permits improved discharge of electrical charges via the energy guiding chain.

According to the invention, the object is solved by an energy guiding chain in which the links are designed such that they are in contact with each other over the full pivoting angle on contact areas that move relative to each other and are in permanent contact and/or are connected, at least in pairs, by a connecting element that provides contact areas remaining in unchanging position in relation to the links, and such that the contact areas, and the areas of the links connecting them, form a continuous conductivity path with low electrical resistance, extending at least over several links, or over the whole chain. This permits use of the chain in ESD protection zones.

It has been found that the measures according to the invention are capable of substantially increasing the dependability of an energy guiding chain in ESD protection zones, such that the chains can, in particular, be used in ESD protection zones pursuant to EN 61340-5-1 or other, comparable technical standards. The measure according to the invention ensures that the links are in permanent, electrically conductive contact with each other over the full pivoting angle, such that electrical charges can be discharged across the links in the longitudinal direction of the chain, and electrostatic charges can be reliably avoided. The contact areas assigned to adjacent links are thus in permanent contact with each other, or of continuous, one-piece design. In contrast, on chains with interlocking pin-and-hole pivoted connections, the conductivity path is apparently interrupted in non-reproducible fashion owing to the potential play in the pivoted connections. The electrical conductivity path extending continuously over several links or over the entire energy guiding chain, or the chain as a whole, can thus essentially or completely consist of a plastic material, as a result of which—if necessary—metallic materials can additionally be avoided entirely.

The continuous electrical conductivity path, which runs through the above-mentioned contact areas and/or the connecting elements, which each preferably connect adjacent links to each other, advantageously extends over the entire length of the energy guiding chain, preferably including the end fastening links of the chain. In this way, electrical charges can be efficiently discharged over the entire length of the energy guiding chain. It may then be sufficient to ground only the two end links of the energy guiding chain, which can particularly be designed as end fastening elements and equipped with means for fastening to the respective consumers, or to provide them with grounding devices. Where appropriate, the continuous electrical conductivity path can also extend over only part of the length of the energy guiding chain, particularly if the links are grounded or connected to grounding devices at suitable points of the chain, to which end electrical connections for grounding devices can be provided, for example. In particular, the entire area of the chain located between the end fastening links can provide a continuous, preferably uninterrupted, conductivity path, separate end fastening links being provided in this context.

It goes without saying that, in the framework of the invention, the contact areas can generally provide linear, or preferably plane, contact between the respectively adjacent links over the full pivoting angle, in which context the links preferably contact each other under force of pressure in the contact area.

The contact areas of the links, which move relative to each other and provide a continuous conductivity path, can be located in the area of the pivoted connections, or provided by the pivoted connections of the links. Thus, the contact areas can, for example, be located immediately adjacently to the pivoted connections, to which end an area projecting laterally from the link can be provided that can be brought into preferably plane contact with the adjacent link. Areas of this kind can, for example, be provided on the outer and/or inner sides of the side pieces of the links.

According to an advantageous embodiment, at least one resilient tongue, which contacts the adjacent link under spring force over the full pivoting angle of the links, can be provided on the pivot pin and/or on the area of the link adjacent to it, which displays a recess accommodating the pivot pin, as a contact area establishing electrical contact. The resilient tongue can be integrally molded on the link. To this end, a part area of the pivot pin itself can, for example, be designed as a resilient tongue, for which purpose the pivot pin can be provided with a slit at the end, or subdivided into several segments, at least one of which, preferably all of which, contact the adjacent link under spring force. In this context, the resilient tongues can, in particular, be designed as snap-in means that engage an undercut in the joint receptacle of the adjacent link or its side piece. An area of the resilient tongue is preferably in plane contact with the adjacent link.

According to a further, alternative embodiment, which can, where appropriate, be realized in addition to the embodiment of the pivoted connections described above, an area that projects towards the respective adjacent link in the longitudinal direction of the chain and is in permanent contact with the side piece of the adjacent link over the pivoting angle, is provided on at least one, or both, of the side parts of the respective links as the contact area establishing electrical contact. Correspondingly, an area that projects towards the respective adjacent link in the longitudinal direction of the chain can, for example, be provided on the cross-members of the links, being in permanent contact with the side piece and/or the cross-member of the respectively adjacent link over the pivoting angle. The pivoted connections of links of this kind can, for example, be provided by a pin-and-hole connection described above, or by a strip-like joint hinge that connects at least two, preferably a plurality, or all links of the energy guiding chain to each other, without being limited to this. The respectively projecting areas can, for example, be designed in the form of tabs or webs. The cross-members can in each case be fastened to the side pieces in detachable fashion, or integrally molded.

Areas projecting towards the adjacent link in this way can preferably be provided on both side pieces of a respective link, which surround the opposite side pieces of the adjacent link on the inside or on the outside and are in contact with them under spring force. As a result, the links can in each case be constrained symmetrically between the areas making contact under spring force, this achieving reliable electrical contact. Given suitable stiffness of the projecting areas, the lateral stability of the energy guiding chain can be increased at the same time.

According to a further, advantageous embodiment, several or all links, preferably links that are immediately consecutive in the longitudinal direction of the chain, are connected in pairs by at least one connecting element that is fixed in place by fastening areas, spaced apart in the longitudinal direction of the chain, on one of the links, where the connecting element is deformed elastically when the links are pivoted relative to each other. The connecting element is fixed on the respective links in its fastening areas, preferably in non-positive fashion and preferably in unchanging position, to which end the respective fastening area can be retained by a press fit in a corresponding receptacle of the respective link. In particular, fixing can be achieved in non-positive and positive fashion. The receptacle for the fastening area of the connecting element is preferably open in the longitudinal direction of the chain, i.e. towards the respectively adjacent link, such that the connecting element practically bridges the adjacent links and is thus capable of providing a continuous conductivity path. The retention of the connecting element on the link, preferably by a press fit, guarantees a low contact resistance between the links and the connecting element at all times.

It goes without saying that the receptacle for the connecting element on the respective link can be designed as an opening of the side piece facing towards the inside of the chain or the outside of the chain or, where appropriate, also towards the upper or lower narrow side of the side piece running in the longitudinal direction of the chain. This opening can essentially correspond to the contour of the longitudinal section of the connecting element, such that the latter is inserted into the recess from the side, or pressed in under force of pressure, in order to be immovably fixed in place on the link. The connecting element preferably displays areas with a wider cross-section or areas with a narrower cross-section, which correspond to corresponding areas of the link with a narrower cross-section or areas with a wider cross-section, and enable preferably linear or plane retention, as a result of which, in the longitudinal direction of the chain, the connecting element can also be positively fixed in place in relation to the longitudinal direction of the chain and, where appropriate, also in the transverse direction of the chain.

The elastic deformation of the connecting element during the pivoting motion of the preferably adjacent links relative to each other can, in particular, be performed in the manner of a bending stress, where the maximum deflection can correspond to the maximum pivoting angle of the links relative to each other. To this end, the connecting element mostly displays retaining areas, spaced apart in the longitudinal direction of the chain, for coupling the force on the links to be connected, and an area located between them that is subjected to bending stress.

Alternatively, the connecting element can also be essentially exposed to torsional stress during elastic deformation. This is particularly possible if the chain links each display laterally overlapping side parts, in which recesses open towards the overlapping area of the adjacent link are provided, which are preferably aligned flush with each other in the transverse direction relative to the chain. In this context, the connecting element can be designed essentially in the manner of a cylinder, where the cylinder ends are located in opposite overlapping areas of adjacent links and can each be provided with non-round areas to afford protection against rotation. Corresponding extensions can also be provided on the ends of the connecting element for this purpose. The middle area of the cylindrical connecting element is then subjected to torsion when the links are pivoted. In this context, the connecting element is preferably located entirely in the cross-sectional area defined by the two overlapping areas of adjacent links.

The connecting element is preferably designed as an elastically deformable element that, following elastic deformation, exerts a restoring force on the links connected by the element. It goes without saying that all statements relating to the invention can also apply to deformable connecting elements that do not exert restoring forces on the links following deformation.

The connecting element can, particularly if it is exposed to bending stress, be partly or completely located between the inner side of the side pieces, facing towards the inside of the chain, and the outer side of the side pieces, facing towards the outside of the chain, or between the lateral sides of the cross-members, such that it preferably does not project laterally beyond the side piece or cross-member. In this context, the connecting element can in each case be located between the upper side and the lower side of the respective link. As an alternative, the connecting element can also be located partly or completely in the interior of the chain, e.g. between opposite inner sides of the side pieces of a link, or in through-openings, running in the longitudinal direction of the chain, in the upper or lower cross-members or side pieces of the links. The width of the connecting element can, in particular, correspond in each case to the width or thickness of the side piece or the width of the cross-member, i.e. its extension in the transverse direction of the chain. In this context, the connecting element can in each case connect two, or also three or more, links of the chain to each other and, for example, extend over one-quarter of the chain, one-half of the chain, or the entire chain. Between the preferably elastically deformable areas of the connecting element, which are spaced apart in the longitudinal direction of the chain, the elastically deformable connecting element can display transitional areas that each extend between the deformable areas and connect them to each other. The transitional areas can, for example, pass by on the outer side of the links, or extend through through-openings or grooves in the links, running in the longitudinal direction of the chain, which can, where appropriate, also be designed to be open towards one side. Referred in each case to the cross-section of the chain, the transitional areas are preferably narrower than the joint areas of the connecting elements.

In general, and particularly in the embodiments described above, the connecting element can in each case constitute the joint element that forms the articulated connection between adjacent links and absorbs the forces transmitted between the links during movement of the chain, particularly tensile and lateral forces. Alternatively or additionally, the connecting element can, in relation to the pivoted connections, also be provided in the form of an additional device and, to this end, be fastened to the links in such a way that the forces acting when the chain moves are essentially absorbed by other areas of the chain. In this case, the device is essentially used for electrical discharge only. The connecting element can, for example, be designed as a strand-like connecting element that is fastened to several links and moves relative to the respective link, or displays moveable areas, e.g. is fastened to the link in the manner of a slipping clutch, or displays length-compensating or expanding areas. This device can, where appropriate, again be integrally molded on parts of the links, e.g. the cross-members or the side pieces.

The contact areas and/or the connecting elements of the links for providing a continuous electrical conduction path can in each case be integrally molded on at least one, of both, of the two links that are electrically connected by the contact area or the connecting element. The contact areas and/or the connecting elements can also be fastened to both links in detachable fashion.

Generally, one or more connecting elements can be provided in each case, which connect more than two links to each other, e.g. three, four or more links, or extend continuously over at least one-quarter of the chain, at least one-half of the chain, or the entire chain in the longitudinal direction. Preferably, the connecting elements also in each case establish an electrically conductive connection between the end fastening links, which can be grounded or provided with grounding devices, and the respectively adjacent chain links. The electrically contacting contact areas or connecting elements acting between the links, or also other contact elements, can be provided for this purpose. Further, grounded chain links or links with grounding devices, e.g. in the form of a fastening for an electrical discharge device, can be provided within the chain, i.e. adjacent to the end fastening links of the chain, or at a distance from them. The distance is preferably several links, e.g. one-quarter of the chain or more. The connecting element then preferably extends continuously from one grounded link, or a link connected or connectable to a grounding device, to another such link, or to an end fastening element of the chain, which is likewise preferably grounded, or provided or fittable with a grounding device, such that a continuous electrical conductivity path is provided in these areas. Electrical charges can then be rapidly discharged via the respectively grounded links.

Where appropriate, two or more connecting elements can also be provided, which interconnect a given group of more than two links.

In particular, the connecting element that enables electrical discharge and interconnects several links in articulated fashion, can be of strip-like design, where the links can be fastened to or on the strip such that the strip is preferably only fastened to the links on one side. The connecting element can be located inside or outside the duct for guiding the electrical lines. The width of the connecting element can roughly correspond to the extension of the bottom elements of the links transverse to the chain, or the width of the links. In this context, the strip-like connecting element can be fastened on the upper side of the bottom elements of the links, i.e. facing towards the interior of the chain, or on the side of the bottom elements of the links that faces away from the interior of the chain, or, where appropriate, be passed through slits or retaining areas of the bottom elements or the side pieces. The strip can also be fastened on the narrow sides of the side pieces.

The connecting element can, particularly if it designed as a strip extending over several links or the entire chain, be fastened to the links in detachable fashion, e.g. by means of suitable snap-in connections, although the links can also be inseparably fastened to the strip or integrally molded on it.

Further, the electrically conductive connecting element can, for example, be designed as a film hinge, by means of which adjacent links are connected to each other in articulated fashion. In this context, the connecting element can be located on the side pieces or the bottom elements, e.g. on the face ends of the same that face towards the adjacent link. Particularly also in this embodiment, the links can be provided with lateral areas that project towards the adjacent link and partially overlap it, e.g. on the inner side or the outer side of the side pieces. It goes without saying that, where appropriate, these areas can additionally be designed as electrically conductive connecting areas that are in contact with the side pieces of the adjacent links under permanent force of pressure over the full pivoting angle of the links. Independently of this design, it is, however, advantageous if the contact areas and/or the connecting elements of electrically conductive design contact the respectively adjacent link under force of pressure.

The contact areas and/or the connecting elements can in each case be made of the same material as, but also of a different material than, the other areas of the links, e.g. the side pieces or bottom elements, particularly of a material having greater conductivity.

The contact areas and/or the connecting elements of the links, particularly the areas of the energy guiding chain that form a continuous conductivity path and encompass said contact areas and/or connecting elements, preferably consist of a material with low resistivity. This enables particularly effective discharge of electrical charges from the energy guiding chain. The side pieces and/or bottom elements of the links preferably consist entirely of a material of this kind, particularly a plastic material.

The total resistance of the energy guiding chain over its entire length is preferably less than/equal to 50,000 ohm or 20,000 ohm, preferably less than/equal to 10,000 ohm, particularly preferably 10,000 ohm to 6,000 ohm, or also less. This particularly applies to energy guiding chains in which the links and the connecting elements consist predominantly or entirely of a plastic material.

Further, the energy guiding chain according to the invention can display, over its length, an electrical surface resistance $R_s$ and/or an end-to-end resistance $R_e$ and/or a point-to-point resistance $R_p$ of $\leq 1\times 10^{10}$ ohm, preferably $\leq 1\times 10^6$ ohm or $\leq 1\times 10^4$ ohm in each case, for example in the range $1\times 10^4 \leq R_p \leq 1\times 10^{10}$ ohm.

Additionally or alternatively, the energy guiding chain according to the invention is designed such that it displays an electrical resistance to EPA ground and/or to a grounding point $R_g$ of $\leq 1\times 10^{12}$ ohm, preferably $\leq 1\times 10^9$ ohm. The above-mentioned resistance is preferably in the range $7.5\times 10^5 \leq R_g \leq 1\times 10^9$ ohm.

The values given above for the total resistance, surface resistance $R_s$, end-to-end resistance $R_e$ and/or point-to-point resistance $R_p$, resistance to EPA ground or to a grounding point, preferably include the end fastening elements in each case. The respectively mentioned electrical resistance can in each case also exist between two links that are each grounded by a suitable electrical, preferably metallic, discharge device, or provided with a suitable grounding device or a preferably electrically conductive fastening means for such a device. In the simplest case, the grounding device can be a connecting point designed for electrical connection of an electrical discharge device. The links that are grounded, or provided with grounding devices or fastening means for such devices, are preferably distributed uniformly over the length of the line guiding device.

It goes without saying that the energy guiding chain can meet all other requirements to DIN EN 61340-5-1, or corresponding national or international standards. In this context, the chain can, where appropriate, be taken as being a work surface pursuant to Table 1 of this European Standard. It goes without saying that the respective determination of the resistances mentioned can likewise be performed according to this standard. Reference is made to Section 5.3 of EN 61340-5-1:2001, regarding the requirements for an EPA grounding device or an EPA ground terminal, to Section A.1 of EN 61340-5-1:2001 regarding the resistance measurement method for testing work surfaces, to Appendix A.1 of DIN standard IEC 1340-4-1 regarding the device for resistance measurements, and to DIN 53482 or DIN IEC 60093 regarding the design of electrodes for measuring the respective resistances. All the above-mentioned standards are herewith included as references. It goes without saying, however, that other pertinent standards can also be used, where appropriate.

In order to provide a material with sufficiently high electrical conductivity, the surface of the respective links, including the surface of the bottom element connecting several links to each other, which can in each case particularly be manufactured as plastic parts, can be provided with a conductive coating, e.g. with a graphite coating or a coating of a metallic or semiconducting material, for example also by galvanization, vaporization methods or the like. Further, as an alternative or in addition, volatile antistatic agents can be incorporated into the material of the line guiding device, particularly in the area of the side pieces and/or the bottom element, or in the contact areas or on the retaining areas of the connecting elements. Particularly preferably, the material intrinsically displays corresponding volume conductivity or surface conductivity in order to meet the above-mentioned conditions, to which end the plastic material can, for example, be provided with corresponding fillers that increase the electrical conductivity, such as carbon fibers, fibers of metallic or semiconducting materials, metallic or semiconducting powders, such as aluminum or silicon powder, carbon black, salts, such as lithium salts, or the like. Finally, discharge wires, such as metallic discharge wires, can be incorporated into the bottom element, also extending over the connecting elements and/or several links, or the entire chain. It goes without saying that the corresponding conductivity can also be created in some other suitable way.

Seen as a whole, it is thus possible to provide a line guiding device for ESD protection zones (ESD: electrostatic sensitive device) and/or for explosion-hazard areas.

Figure 1B:
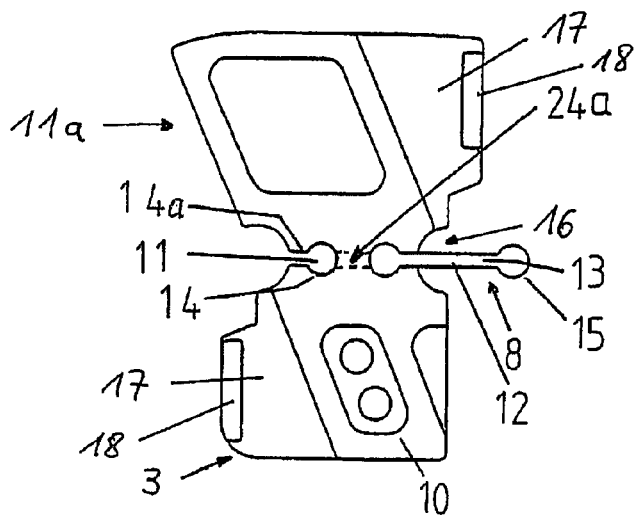
Figure 2A:
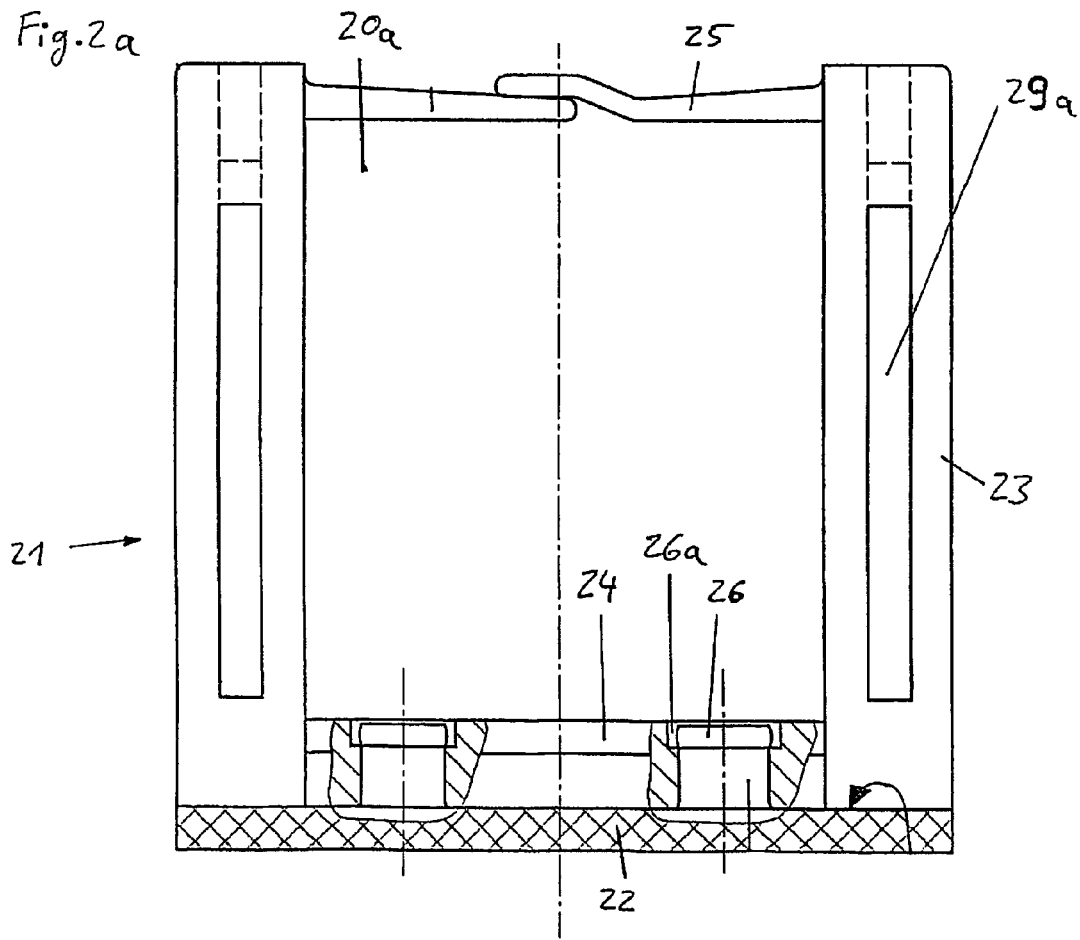
Figure 2B:
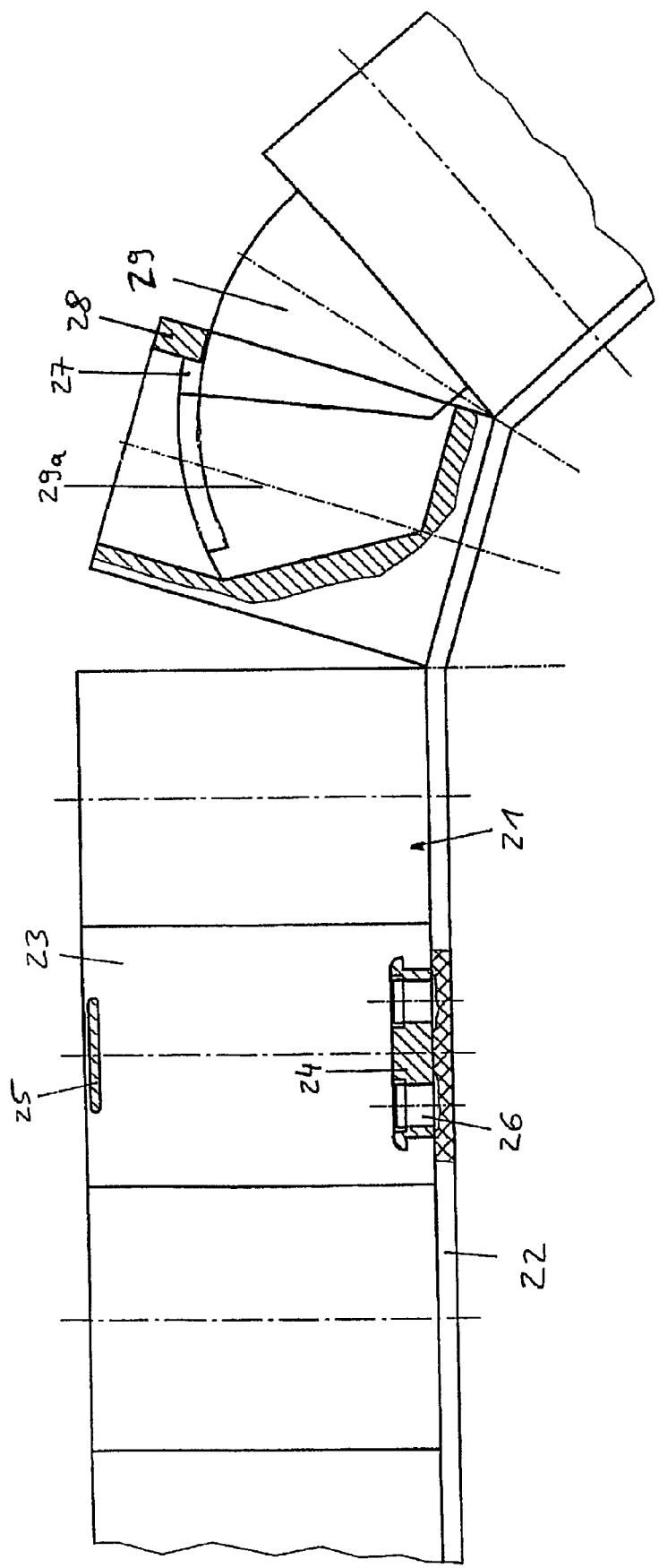
Figure 3:
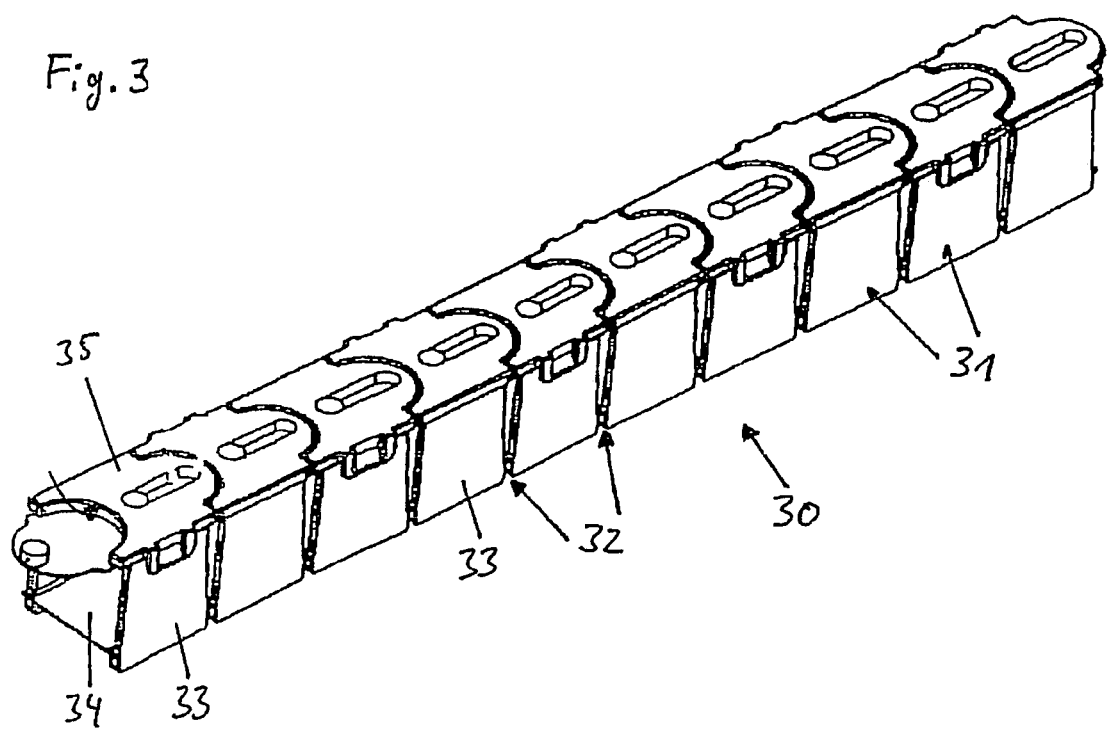
Figure 4A:
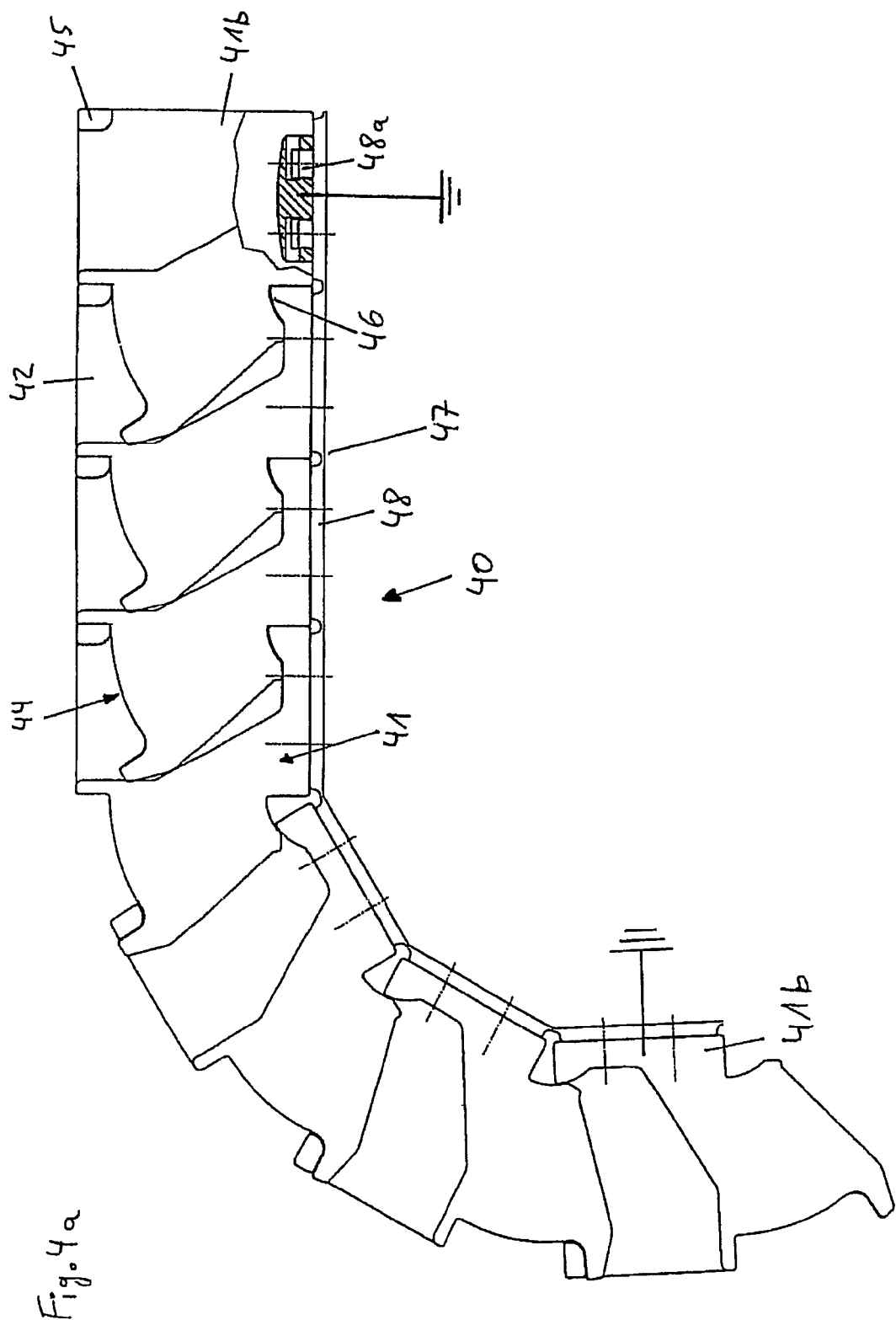
Figure 5A:
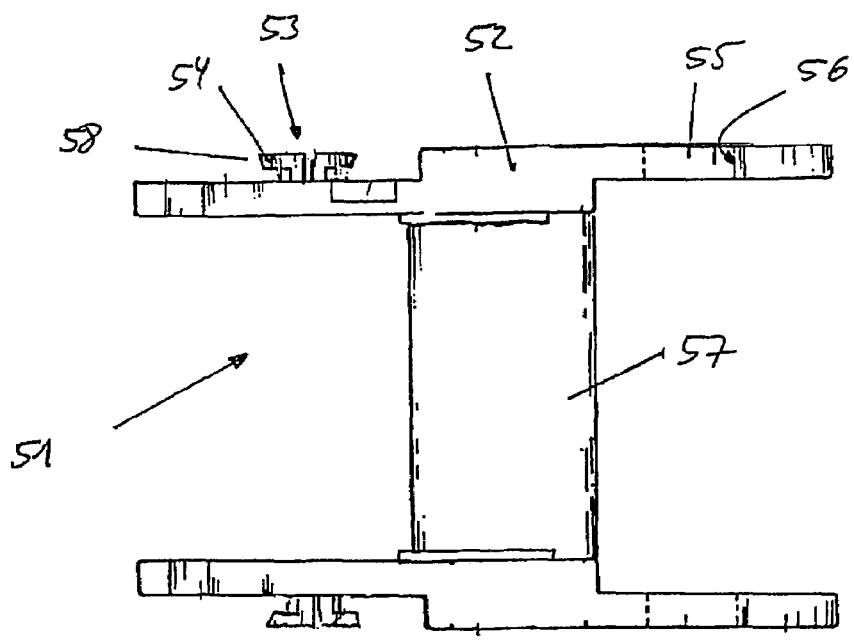
Figure 5A:
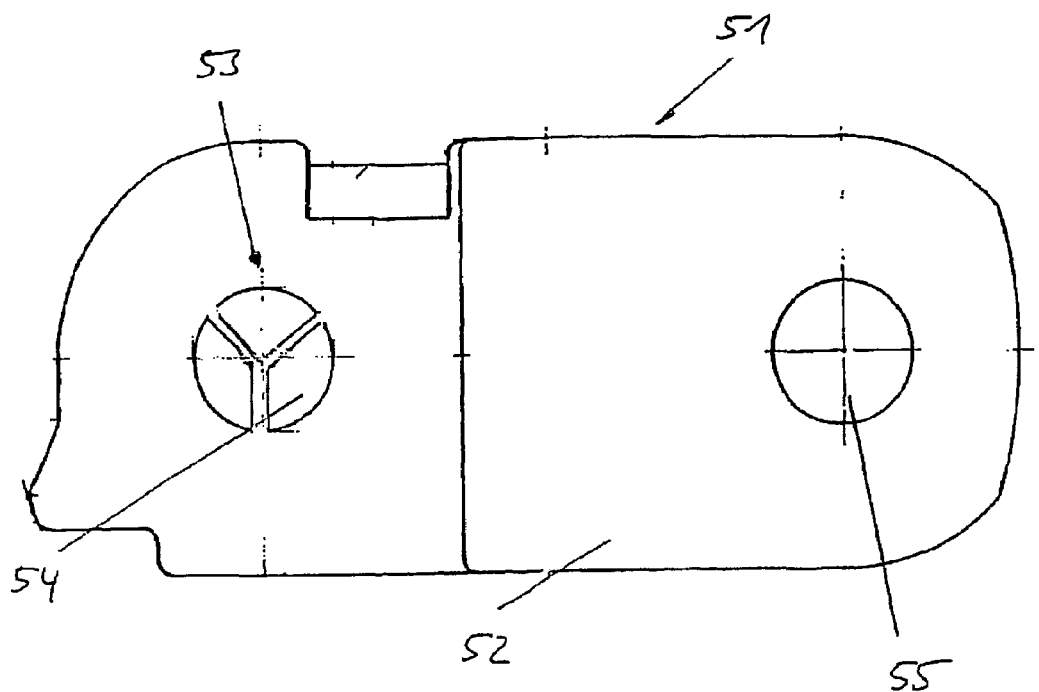

An example of the invention is described below and explained on the basis of the Figures. The Figures show the following:

FIG. 1 A perspective representation (FIG. 1a) and a side view (FIG. 1b) of a first embodiment of an energy guiding chain according to the invention, FIG. 2 A cross-sectional view (FIG. 2a) and a side view (FIG. 2b) of a further embodiment of an energy guiding chain according to the invention, FIG. 3 A perspective representation of a further embodiment of a chain according to the invention, FIG. 4 A side view (FIG. 4a) of a further embodiment of an energy guiding chain according to the invention, and front and side views of a chain link (FIGS. 4b, 4c), FIG. 5 A top view (FIG. 5a) and a side view (FIG. 5b) of a further embodiment of a link of a chain according to the invention.

FIG. 1 shows, in a first embodiment, an energy guiding chain 1 according to the invention, with a plurality of links 2, which are connected to each other in articulated fashion and each consist of two opposite side pieces 3, at least one cover element 4a in the form of a cross-member connecting the two side pieces to each other, and at least one bottom element 4b in the form of a further cross-member. According to the practical example, only some of the links are equipped with corresponding bottom elements and cover elements, in order to separate the two opposite strands of side pieces from each other. The energy guiding chain is arranged to form an upper run 5, a curved section 6, and a lower run 7. The individual links 2 are connected to each other in articulated fashion by separate connecting elements 8, which are preferably fastened in detachable fashion, are subjected to bending stress during traveling motion of the chain, and can be deformed elastically, developing a restoring force.

Side pieces 3, particularly the areas between adjacent connecting elements 8 of a side piece, and also the connecting elements, consist of a plastic material with high electrical conductivity. It goes without saying that bottom and cover elements 4a, 4b preferably also consist of a material of this kind.

Connecting elements 8 are retained in recesses 11 in side pieces 3, which are designed to be open towards face end 11a, i.e. towards the adjacent link. Further, recesses 11 are designed to be open at least towards one lateral surface, towards both lateral surfaces according to the practical example, such that connecting elements 8 can be inserted laterally into recesses 11. Connecting elements 8 display wider fastening areas 15, which engage the area with a wider cross-section 14 of recess 11, in order to guarantee positive retention of the connecting elements in this way when tensile force is exerted in the longitudinal direction of the chain. It goes without saying that a positive fit can also be achieved in some other suitable way. Independently hereof, the connecting elements are similarly retained in recesses 11 in non-positive fashion to secure them against lateral displacement, to which end the connecting elements have to be forced between jaws 14a and into the recesses by applying force of pressure, this simultaneously establishing good electrical contact between the components. Additional means can be provided to secure the connecting elements in the transverse direction. Elastic deformation of the connecting elements is facilitated by the fact that a cut-out 16 in the links is provided between opposite recesses 11 at the height of deformable area 12, said cut-out being of roughly semi-circular design in this instance.

According to FIG. 1, connecting elements 8 can each extend over several links in the longitudinal direction of the chain, to which end transitional areas 8a are provided between fastening areas 15, the width of which is smaller than that of areas 12 subject to elastic bending stress, which can have the width of the side pieces. As a result, connecting element 8 can also extend over the full length of the chain and provide a continuous conductivity path. The transitional areas are thus located in grooves (represented by broken lines) provided in web-like areas 24a of the links.

Because of the bending stress, connecting elements 8 can consist of a different material than the side pieces. The connecting elements can consist of a material with higher electrical conductivity than that of the links, especially since the total length of the connecting elements exceeds the longitudinal extension of web-like areas 24a in the longitudinal direction of the chain. Overall, this means that connecting elements 8, and web-like areas 24a of the links remaining between them, provide a continuous electrical conductivity path for the chain, via which electrical charges can be discharged, with little electrical resistance, to the end fastening elements or end links of the chain, which are grounded, or to other grounded links of the chain. The joint elements, preferably including their connecting areas if the joint elements extend over several links or the entire chain, may have been rendered electrically conductive, particularly by means of surface treatment methods, e.g. by galvanization, vaporization, particularly with metals or semiconducting materials, or the like. This also applies accordingly to other embodiments of the chain according to the invention with separate joint elements, e.g. in the form of strips. However, it is also possible for part areas of chains of different design to be surface-treated accordingly in order to provide a continuous electrical conductivity path.

The side pieces of the links furthermore display overlapping areas 17, which are provided with laterally protruding projections 18, which can simultaneously serve as stops. Projections 18 engage corresponding openings in the adjacent links, which are open towards the overlapping area of the adjacent link. Where appropriate, these overlapping areas can be in contact with each under permanent force of pressure over the entire pivoting angle, to which end, for example, projections 18 protrude sufficiently far in the axial direction. Given a suitable choice of material for the respective areas, this also makes it possible to establish electrical contact between adjacent links that is preserved throughout the entire pivoting movement of the links. Owing to the resultant increase in friction losses during movement of the chain, a measure of this kind may also be dispensable, although it can also be realized as an alternative to an electrically conductive design of the connecting elements.

FIG. 2 shows a further practical example of a chain 20, which displays a plurality of links 21 that are fastened on a strip-like joint element 22. Forming a cable guide duct 20a, the links here again each display opposite side pieces 23, and a bottom element 24 connecting them, where upper cover element 25 is designed as a perforated cross-member. Strip-like joint element 22 again provides a continuous electrical conductivity path, to which end the material forming the strip has high electrical conductivity, which can be higher than the conductivity of the link material, although this is not always necessary. The links or, more precisely, the undersides of the bottom elements and/or the side pieces are fastened on the strip here under a certain force of pressure, providing electrical contact areas. To this end, the strip is provided with snap-in projections 26, which engage recesses 26a in the bottom elements, which are provided with an undercut, and press the links against the strip under a certain pre-tension. It goes without saying that, where appropriate, the snap-in projections can also be provided on the bottom elements, and corresponding snap-in recesses on the strip. In addition to the snap-in means with the snap-in receptacles, contact areas according to the invention between the strip and the link are, as also in the other, similar embodiments, moreover also provided by the sides of the cross-members or bottom elements facing the strip, which can be the side facing towards or away from the guide duct, and the contact surface of the strip.

Further, the links display lateral guide elements 29, which reach around partial areas of the side parts of the adjacent links and, to this end, engage pockets 29a in the same, and can make lateral contact with the side pieces of the adjacent links, under a certain pre-tension where appropriate, in order to enable electrical discharge of charges via the guide elements, additionally or alternatively to the strip. However, these guide elements are primarily intended to increase the lateral or transverse stability of the chain, and to provide stops by means of projections 27, where appropriate, these engaging lateral projections 28 of the side pieces. It goes without saying that strip 22 can extend continuously and in one piece over the entire length of the chain, although two or more strips can also be arranged consecutively, where appropriate. In the latter case, the link connecting two strips is then preferably likewise made of a material with high electrical conductivity, or an additional electrical bridging contact is provided.

FIG. 3 shows a chain 30, constructed similarly to that in FIG. 2, where the individual links 31 of the chain are, however, connected to each other by integrally molded joint elements 32. Again, at least some, or all, of the links 31 display opposite side pieces 33 and a bottom element 34 connecting them, as well as a cover element 35, thus forming a cable guide duct. Together with the bottom elements, joint elements 32 form a continuous strip, where the joint elements can be designed in the manner of film hinges, but can also have the material thickness of the bottom elements, to which end side pieces 33 are spaced a small distance apart in the joint area. The chain can be produced in one piece over its entire length. Where appropriate, it is also possible for several segments, each designed as one piece and extending over a plurality of links, to be connected to each other. The entire chain, or the individual segments, can in each case be made of a single material displaying high electrical conductivity, as described in connection with the first practical example. In this instance, the chain is manufactured as a one-piece injection molding, although extruded parts can also be designed correspondingly as a chain, where appropriate. The links can display a certain stiffness, such that they are essentially rigid under normal operating conditions, although this is not always compulsory.

FIG. 4 shows a further embodiment of chain 40 according to the invention, where the individual links 41 each display side pieces 42 with areas 42a, which project from the face end and overlap the adjacent link. The links are fastened on a flexible strip 48, by means of snap-in means according to the practical example, to which end snap-in projections 48a on the strip can engage recesses 41a in the links. The upper and lower ends of overlapping areas 42a are each provided with arc-shaped sections 43, 44, which additionally serve as lateral guides for the adjacent link during the pivoting movement. A vertical offset between adjacent links is prevented by projections 45, 46 on the side pieces of the adjacent links, which reach over or under arc-shaped sections 43, 44.

It goes without saying that joint hinge 48 can display high electrical conductivity, providing a conductivity path, in which context the strip can extend over the full length of the chain, or two strip segments can be fastened in unchanging position on a link with high electrical conductivity, e.g. by the snap-in means, particularly under force of pressure against the strip, such that the undersides of the bottom elements and/or of the side pieces act as electrical contact areas. The links can be fastened to the strip in detachable or non-detachable fashion. Where appropriate, however, the strip can also be absent, to which end elastic projections can be integrally molded on the bottom area of a link, reaching below the bottom area of the adjacent link. In this case, a continuous electrical conductivity path can, for example, be provided by one of both of the arc-shaped sections 43, 44 being guided in close contact on the corresponding projection, particularly under force of pressure, and at least the corresponding sections 44 and 46 or 43 and 45 of the side pieces and the connecting areas between them (or also the entire side pieces or entire links) consisting of a material with high electrical conductivity. Contact areas 44, 46 are connected to each other in electrically conductive manner by web-like area 46a or the side piece. This would preferably apply to the arc-shaped areas adjacent to joint axes 47. Force of pressure of arc-shaped section 44 on the likewise arc-shaped surface of projection 46, these two being guided on each other over the entire pivoting angle, can particularly be generated by strip 48 (or a correspondingly designed tab that only reaches under the adjacent link), by means of which links 41 are pressed against each other in a direction perpendicular to the longitudinal direction of the strip and parallel to the side pieces. In this context, the force of pressure can be generated by snap-in means 48a for fastening the links on the strip, particularly if snap-fitting is accomplished under pre-tension of the links relative to the strip. It goes without saying that, referred to the conductivity path via arc-shaped areas 44, 46, the strip can simultaneously or alternatively thus consist of a material with high electrical conductivity.

FIG. 4 shows, in schematic form, examples of two links designed as grounded links 41b, which are connected to ground in electrically conductive fashion. It goes without saying that the electrical discharge lines to ground can also be routed along the chain. The specified resistance of approx. 10,000 ohm can thus also be present between links 41b. Links 41b are then connected to each other by a continuous conduction path, e.g. in the form of a continuous strip 48. Arrangements of this kind are possible with very long chains, in particular. It goes without saying that the same also applies to the other practical examples.

FIG. 5 shows a further embodiment, where only one link 51 of an energy guiding chain is illustrated. The links are each connected by means of pivoted connections, in which pivot pins 53 on one side piece 52 of a first link engage pin receptacles 55 on the side pieces of the respectively adjacent link. The side pieces are connected by at least one cross-member 57. Pivot pins 53 each display resilient tongues 54, the electrically contacting contact areas 58 of which contact inner side 56 of the pin receptacle of the adjacent link under a certain force of pressure over the entire pivoting angle of the links. To set the force of pressure and to avoid seizing of the pivoted connections, pins 53 are divided into at least two, e.g. three, segments by notches. The pins can additionally be designed as hollow pins to this end. It goes without saying that the pins can also pass completely through the opposite side pieces and contact their outer sides. At least the pivot pins and the areas of the pin receptacle are made of a material with high electrical conductivity, where the connecting areas of the pivot and the receptacle of each link should likewise display high electrical conductivity in order to form a continuous conductivity path.

It goes without saying that the embodiments illustrated can always be manufactured as plastic moldings. In particular, the chains or their links can in each case be manufactured as injection moldings.

The chains according to the practical examples each display, over their entire length, an electrical resistance of less than/equal to 20,000 ohm, more precisely approx. 6,000 ohm to 10,000 ohm. In this context, the chain length can be half a meter or a meter, or longer, e.g. even 10 meters or more.

LIST OF REFERENCE NUMBERS

1 Energy guiding chain
2 Link
3 Side piece
4a Cover element
4b Bottom element
5 Upper run
6 Curved section
7 Lower run
8 Connecting element
8a Transitional area
11 Recess
11a Face end
12 Flexurally elastic area
14 Area of wider cross-section
15 Fastening area
16 Cut-out
17 Overlapping area
18 Projection
20 Chain
21 Link
22 Joint element
23 Side piece
24 Bottom element
24a Web-like area
25 Cover element
26 Snap-in projection
27 Projection
28 Axial projection
29 Guide element
30 Chain
31 Link
32 Joint element
33 Side piece
34 Bottom element
35 Cover element
40 Chain
41 Link
41a Recess
42 Side piece
42a Overlapping area
43, 44 Arc-shaped section
45, 46 Projection
47 Joint axis
48 Strip
48a Snap-in projection
49a Grounded link
50 Chain
51 Link
52 Side piece
53 Pivot pin
54 Resilient tongue
55 Pin receptacle
56 Inner side
57 Cross-member
58 Contact area

The invention claimed is:

1. Energy guiding chain for guiding lines and cables between two consumers, at least one of which is mobile, where the energy guiding chain displays a plurality of directly adjacent links connected to each other in articulated fashion, each of which displays opposite side pieces and at least one cross-member connecting them, forming a cable guide duct, where the individual links are connected to each other by at least one connecting element that permits pivoting of adjacent links through a pivoting angle relative to each other, where the energy guiding chain can be arranged to form a lower run, a curved section and an upper run, including end fastening links, and where the links consist at least partly of an electrically conductive material that permits the discharge of electrical charges over at least part of the chain length and said chain provides electrostatic discharge compatibility, characterized in that directly adjacent links are connected to each other by at least one connecting element and contact areas are provided between said directly adjacent links, said contact areas comprising at least one arc-shaped section of one link which is in contact with a projection of a directly adjacent link, and in that the connecting element extending between said directly adjacent links and said contact areas form a continuous conductivity path with low electrical resistance, which extends at least over several links and wherein at least one of the links that are located between the end fastening links of the chain, or also encompass them, is grounded, or connected to a grounding device, or fitted with means for electrically conductive connection to a grounding device.

2. Energy guiding chain according to claim 1, characterized in that the continuous electrical conductivity path extends over the entire length of the energy guiding chain.

3. Energy guiding chain according to claim 1, characterized in that the links and/or the at least one connecting element display low resistivity.

4. Energy guiding chain according to claim 1, characterized in that the contact areas of the links that move relative to each other and provide a continuous conductivity path between adjacent links, are provided by areas adjacent to the pivoted connection or by the pivoted connections of the links.

5. Energy guiding chain according to claim 1, characterized in that said projection is provided, at least on one, or both, of the side pieces of the links, being in contact with the arc-shaped section of the adjacent link over the pivoting angle.

6. Energy guiding chain according to claim 5, characterized in that areas projecting towards the adjacent link are provided on both side pieces of a respective link, which both surround the opposite side pieces of the adjacent link on the inside or on the outside and have at least partial areas in contact with the respective side piece under spring force.

7. Energy guiding chain according to claim 1, characterized in that the connecting element connects several links to each other, forming a continuous conductivity path.

8. Energy guiding chain according to claim 7, characterized in that the connecting element extends over the entire length of the energy guiding chain, and in that the connecting element provides the pivoted connection connecting the links to each other in pairs.

9. Energy guiding chain according to claim 1, characterized in that the connecting element is a flexible strip, and in that the links are fastened to or on the strip.

10. Energy guiding chain according to claim 1, characterized in that the contact areas of one link and/or the at least one connecting elements contact the adjacent link under force of pressure.

11. Energy guiding chain according to claim 1, characterized in that the links and/or the connecting elements at least essentially consist of a plastic material.

12. Energy guiding chain according to claim 1, characterized in that an end link on at least one end, or both ends, of the energy guiding chain is designed as an end fastening element and provided with fastening means for fastening the energy guiding chain on a consumer, and in that the end fastening link is connected to the respectively adjacent link via an electrical connection.

13. Energy guiding chain according to claim 1, characterized in that, over its entire length, or over a distance in the longitudinal direction of the chain between two adjacent links that are grounded, or provided with a grounding device, or with fastening means for such a device, the chain displays an electrical resistance R of approx. 50,000 ohm or less and/or an electrical surface resistance $R_s$ and/or an end-to-end resistance $R_e$ and/or a point-to-point resistance $R_p$ of $\leq 1 \times 10^{10}$ ohm.

* * * * *